United States Patent
Petridis

(10) Patent No.: US 10,744,996 B2
(45) Date of Patent: Aug. 18, 2020

(54) STOP-START SYSTEM FOR A MOTOR VEHICLE

(71) Applicant: FORD GLOBAL TECHNOLOGIES, LLC, Dearborn, MI (US)

(72) Inventor: Anthemios Philemon Petridis, Bishop's Stortford (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 63 days.

(21) Appl. No.: 16/107,266

(22) Filed: Aug. 21, 2018

(65) Prior Publication Data

US 2019/0061732 A1    Feb. 28, 2019

(30) Foreign Application Priority Data

Aug. 25, 2017    (GB) .................................. 1713684.7

(51) Int. Cl.
| | |
|---|---|
| *B60W 10/06* | (2006.01) |
| *B60W 30/18* | (2012.01) |
| *B60W 10/18* | (2012.01) |
| *F02D 41/04* | (2006.01) |
| *F02N 11/08* | (2006.01) |

(52) U.S. Cl.
CPC ...... *B60W 10/06* (2013.01); *B60W 30/18018* (2013.01); *B60W 10/18* (2013.01);
(Continued)

(58) Field of Classification Search
CPC ............ Y10T 477/813; Y10T 477/816; B60W 10/06; B60W 30/18018; B60W 30/18027;
(Continued)

(56) References Cited

U.S. PATENT DOCUMENTS

2002/0028726 A1*  3/2002  Morimoto .............. F02D 17/04
                                                          477/102
2005/0140208 A1     6/2005  Ji
(Continued)

FOREIGN PATENT DOCUMENTS

CN         104228818 A      12/2014
FR           3026706 A1       4/2006
(Continued)

OTHER PUBLICATIONS

English translation of GB2445447A; http://translationportal.epo.org; Oct. 7, 2019 (Year: 2019).*
(Continued)

*Primary Examiner* — Roger L Pang
(74) *Attorney, Agent, or Firm* — Brooks Kushman PC; David Kelley

(57) ABSTRACT

A stop-start system and method for a motor vehicle include a controller configured to shut down an engine of the motor vehicle automatically when the motor vehicle is moving and a predetermined engine shut down condition is achieved, to perform a rolling stop-start operation; and a mechanically driven auxiliary vacuum pump coupled to a transmission gear or output shaft and configured to provide vacuum pressure to a brake booster of the motor vehicle, wherein the controller is configured to operate the auxiliary vacuum pump during the rolling stop-start operation.

14 Claims, 3 Drawing Sheets

(52) U.S. Cl.
CPC ............. *B60W 30/18027* (2013.01); *B60W 2030/1809* (2013.01); *B60W 2710/182* (2013.01); *F02D 41/042* (2013.01); *F02N 11/0844* (2013.01); *Y10T 477/813* (2015.01); *Y10T 477/816* (2015.01)

(58) Field of Classification Search
CPC ... B60W 2030/1809; B60W 2710/182; B60W 10/18; B60W 20/00; B60W 10/30; B60W 10/11; F02N 11/0844; F02N 11/0803; F02D 41/042; B60T 13/46
See application file for complete search history.

(56) References Cited

U.S. PATENT DOCUMENTS

| | | | |
|---|---|---|---|
| 2010/0230187 A1* | 9/2010 | Kraft | B60K 6/26 180/53.8 |
| 2013/0158838 A1 | 6/2013 | Yorke et al. | |
| 2013/0179053 A1* | 7/2013 | Matsunaga | B60W 10/02 701/112 |
| 2015/0314768 A1* | 11/2015 | Wright | B60W 10/182 701/22 |
| 2018/0003143 A1 | 1/2018 | Khafagy et al. | |

FOREIGN PATENT DOCUMENTS

| | | | | |
|---|---|---|---|---|
| GB | 2445447 A | * | 7/2008 | ............ B60T 1/10 |
| GB | 2506704 A | | 4/2014 | |
| JP | S59190446 A | | 10/1984 | |
| JP | 2004324447 A | | 11/2004 | |
| JP | 2013060171 A | | 4/2013 | |

OTHER PUBLICATIONS

GB Examination Report GB 1 713 684.7 Filed Feb. 13, 2018, 7 pages.

* cited by examiner

STOP-START SYSTEM FOR A MOTOR VEHICLE

CROSS-REFERENCE TO RELATED APPLICATIONS

This application claims foreign priority benefits under 35 U.S.C. § 119(a)-(d) to GB Application 1713684.7 filed Aug. 25, 2017, which is hereby incorporated by reference in its entirety.

TECHNICAL FIELD

The present disclosure relates to a stop-start system for a motor vehicle that may be configured to allow a period of a rolling stop-start operation of the motor vehicle to be extended.

BACKGROUND

Many motor vehicles include a stop-start (or start-stop) system configured to automatically shut down an engine of the motor vehicle when the vehicle is stationary to reduce the time the engine spends idling, thereby reducing the fuel consumption of the motor vehicle.

Conventional starter motors are only able to operate to restart the vehicle engine when the vehicle is in a neutral gear. Hence, conventional stop-start systems typically operate to shut down the engine of the vehicle when the vehicle is stationary and in a neutral gear.

Modern mild hybrid vehicles often include a Belt Integrated Starter-Generator (BISG), which enables torque to be provided to the engine, to crank and re-start the engine, while the vehicle is moving and is in gear.

The inclusion of the BISG within the motor vehicle enables the stop-start system of the motor vehicle to be extended so that the engine can be stopped while the vehicle is in gear and is moving, with the option of restarting the engine if the driver wants to accelerate the vehicle. This may be referred to as a rolling stop-start operation of the motor vehicle.

A limiting factor for the ability of a motor vehicle to perform a rolling stop-start operation is often the availability of vacuum pressure within a brake booster of the motor vehicle, which is only supplied to the brake booster while the engine is running. As the vehicle is moving during a rolling stop-start operation, it is more likely that a driver of the vehicle will apply and modulate the brakes during the rolling stop-start operation, compared to during a stop-start operation performed while the vehicle is stationary.

It is desirable to ensure that brake booster vacuum pressure is available to assist a driver in braking the vehicle, and hence, stop-start systems are typically configured to restart the engine when the vacuum pressure drops below a desirable level, ending the stop-start operation.

SUMMARY

The term "vacuum pressure" used within the specification is used to refer to a pressure that is less than atmospheric pressure. Vacuum pressures have a negative magnitude. In other words, the greater the level of a vacuum pressure, the more negative the pressure is relative to atmospheric pressure. References to vacuum pressures being increased correspond to increases in the differences between the vacuum pressures and atmospheric pressure, i.e. the vacuum pressure becoming more negative. Similarly, references to vacuum pressures being depleted or reduced, relate to the pressures returning, e.g. becoming less negative and closer to atmospheric levels.

According to an aspect of the present disclosure, there is provided a stop-start system for a motor vehicle, the stop-start system comprising: a controller configured to shut down an engine of the motor vehicle automatically when a predetermined engine shut down condition is achieved and restart the engine when a predetermined engine restart condition is achieved; and a mechanical pump operatively coupled to a transmission of the motor vehicle, wherein the controller is configured to operate the mechanical pump when the engine has been shut down automatically, to maintain or increase a vacuum pressure of a brake booster.

The controller may operate the mechanical pump when a speed of the motor vehicle is above a threshold speed, e.g. during a rolling stop-start operation.

According to another aspect of the present disclosure, there is provided a stop-start system for a motor vehicle, the stop-start system comprising: a controller configured to shut down an engine of the motor vehicle automatically when the motor vehicle is moving, e.g. when a speed of the motor vehicle is above a threshold speed, and a predetermined engine shut down condition is achieved, to perform a rolling stop-start operation; and an auxiliary vacuum pump configured to provide vacuum pressure to a brake booster of the motor vehicle, wherein the controller is configured to operate the auxiliary vacuum pump during the rolling stop-start operation.

During the rolling stop-start operation, power may not be provided, e.g. by the engine, to the wheels to drive the vehicle.

The auxiliary vacuum pump may be an electrically driven vacuum pump. Alternatively, the auxiliary vacuum pump may be a mechanically driven pump.

The auxiliary vacuum pump may be driven by a starter motor of the motor vehicle, such as a belt integrated starter motor. Alternatively, the auxiliary vacuum pump may be driven by another electric motor provided on the vehicle.

The controller may be configured to control the starter motor to decouple the starter motor from the engine, e.g. from a crankshaft of the engine, when the auxiliary vacuum pump is being driven by the starter motor. In this way the engine may not be cranked when the starter motor is operated to drive the auxiliary vacuum pump. The auxiliary vacuum pump may be decoupled by a clutch provided between the start-motor and the engine or by disengaging a gear of the starter motor from the engine.

The controller may be configured to selectively couple the auxiliary vacuum pump to an output shaft of a transmission of the vehicle.

The controller may be configured to operate the auxiliary vacuum pump when the speed of the vehicle is below a further threshold speed, e.g. by coupling the auxiliary vacuum pump to the output shaft of the vehicle transmission. The further threshold speed may correspond to a speed below which the vehicle may be capable of performing a rolling stop-start operation.

The auxiliary vacuum pump may be operatively coupled to a shaft of the transmission such that the auxiliary vacuum pump may be driven by the transmission when the transmission is configured to provide a low gear ratio, e.g. such that a greater number of revolutions of the engine provide fewer revolutions of an output shaft of the transmission compared to when the transmission is configured to provide a higher gear ratio, or is in a neutral gear. For example, a low gear of the transmission may be selected, e.g. by a driver, such as first or second gear. Alternatively, the low gear ratio or neutral gear may be selected by the controller, e.g. when rolling stop-start operation of the motor vehicle is initiated or when it is desirable to increase the vacuum pressure available within a brake booster chamber during a rolling stop-start operation.

A motor vehicle assembly may comprise the stop-start system according to any of the preceding claims. The motor vehicle assembly may further comprise the engine and/or the transmission.

The motor vehicle assembly may be configured such that a vacuum pressure is generated at an inlet of an engine of the motor vehicle assembly, e.g. when the engine is running. The motor vehicle assembly may comprise an inlet system, the inlet system and the engine may be together configured such that the vacuum pressure is generated at the engine inlet. The motor vehicle assembly may be configured to provide vacuum pressure to the brake booster by virtue of the engine inlet vacuum.

The motor vehicle assembly may further comprise a main vacuum pump configured to operate while the engine is running to provide vacuum pressure to the brake booster. The main vacuum pump may be a mechanical vacuum pump operatively coupled to the engine or a venturi device operating across a pressure difference generated by virtue of the engine's operation, e.g. due to a vacuum pressure generated at an inlet manifold of the engine.

The motor vehicle assembly may further comprise a Belt Integrated Starter-Generator (BISG). The controller, or a further controller, may be configured to operate the BISG to provide power to drive wheels of the motor vehicle during the rolling start stop operation of the motor vehicle. Providing power to drive wheels of the motor vehicle may enable the vehicle to perform a maneuver, such as a parking maneuver.

According to another aspect of the present disclosure, there is provided a method of operating a stop-start system for a motor vehicle, wherein the method comprises: automatically shutting down an engine of the motor vehicle when the motor vehicle is moving, e.g. travelling at a speed greater than a predetermined threshold speed, and a predetermined engine shut down condition is achieved to perform a rolling stop-start operation of the motor vehicle; and operating an auxiliary vacuum pump provided on the vehicle during the rolling stop-start operation to provide vacuum pressure to a brake booster of the motor vehicle.

The method may further comprise: determining a pressure of the brake booster, e.g. using a pressure sensor provided on the motor vehicle. The auxiliary vacuum pump may be operated when a pressure of the brake booster rises above a threshold value.

The method may further comprise predicting whether the brakes are expected to be applied, e.g. by a driver or automatic braking system of the vehicle. The auxiliary vacuum pump may be operated if the brakes are expected to be applied.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
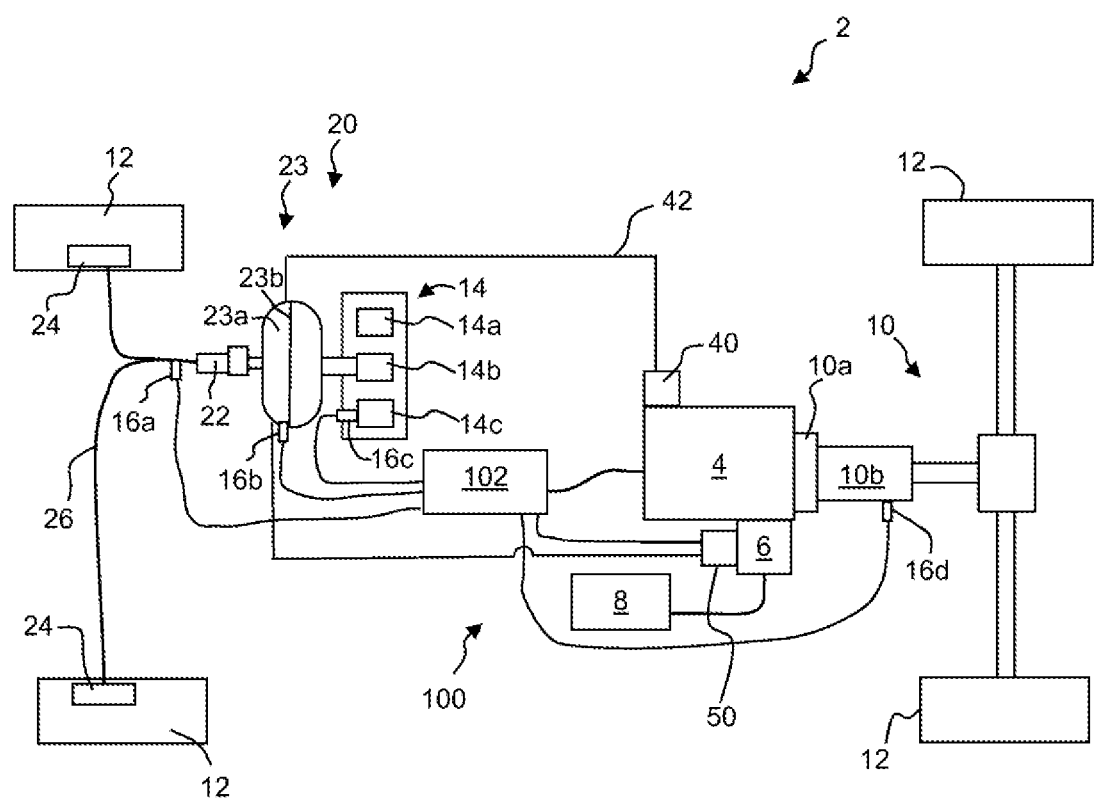
FIG. 1 is a schematic view of a vehicle assembly according to arrangements of the present disclosure.

With reference to FIG. 1, a vehicle 2, such as a motor vehicle, comprises an engine 4 and a transmission or drive system 10 configured to transmit power from the engine 4 to wheels 12 of the vehicle to drive the vehicle. The vehicle 2 further comprises a starter motor, such as a Belt Integrated Starter-Generator 6 (BISG) configured to selectively provide mechanical power to the engine 4, e.g. to a crankshaft of the engine, to crank and start the engine 4. A battery 8 is electrically coupled to the BISG 6.

The drive system 10 may comprise a clutch 10a, configured to operatively couple the engine 4 to the drive system 10, and a gear box 10b, configured to allow a gear ratio between the engine 4 and the wheels 12 to be selectively varied.

In the arrangement depicted in FIG. 1, the vehicle 2 is a mild hybrid vehicle and the BISG 6 can be controlled to provide torque to the crankshaft while the engine 4 is operating to provide additional power to drive the vehicle 2. Additionally, the BISG 6 may be configured to selectively receive torque from the crankshaft of the engine 4 to charge the battery 8, e.g. while the vehicle 2 is decelerating.

In some arrangements, the BISG 6 may be configured to provide power to the drive system 10 when the engine 4 is shut down to enable the vehicle 2 to perform maneuvers, e.g. low speed maneuvers, such as parking. However, the vehicle 2 may not be configured to operate without the engine 4, e.g. using power from the BISG 6, during normal driving, e.g. outside of low speed maneuvers.

In other arrangements of the present disclosure, the vehicle 2 may be a full hybrid vehicle and may further comprise one or more electric motors configured to provide power to the drive system 10. In such arrangements, the vehicle may be capable of operating in an electric only mode, in which the engine 4 is not used to directly provide power to the wheels 12. In electric only mode, the engine 4 may be shut down. Alternatively, the vehicle 2 may not comprise a hybrid drive system and the starter motor may be a conventional starter motor configured to selectively couple to a ring gear of the engine 4.

The vehicle 2 further comprises driving controls 14, such as an accelerator pedal 14a, a brake pedal 14b and a clutch pedal 14c. The driving controls 14 may be operated by a driver of the vehicle 2 to control the operation of the vehicle. In particular, the driver may operate the accelerator pedal 14a to control the amount of torque provided by the engine 4; the clutch pedal 14c may be used to control the operation of the clutch 10a to couple and decouple the engine 4 and the drive system 10; and the brake pedal 14b may be operated to control the braking torque supplied by a brake system 20 of the vehicle described below.

In the arrangement shown in FIG. 1, the drive system 10 comprises a manual transmission, and the operation of the clutch 10a to couple and decouple the gearbox 10b from the engine 4 can be directly controlled by the driver, e.g. by depressing the clutch pedal 14c. However, in other arrangements of the disclosure, the drive system 10 may comprise an automatic transmission configured to automatically change a gear ratio between the engine 4 and the wheels 12. In such arrangements, the clutch pedal 14c may be omitted with clutch 10b operated by the controller as in an automated mechanical transmission, or replaced by a torque converter in automatic transmission, for example.

The vehicle 2, further comprises the brake system 20 that can be operated by the driver of the vehicle 2, e.g. by depressing the brake pedal 14b, to decelerate the vehicle 2. The brake system 20 comprises, brakes 24, e.g. calipers or drums, configured to selectively engage with surfaces associated with the wheels 12 to apply a braking torque to the wheels 12. The brake system 20 further comprises a brake master cylinder 22 and brake lines 26 configured to carry brake fluid between the brake master cylinder 23 and the brakes 24 to selectively activate the brakes 24. When the driver depresses the brake pedal 14b, the brake master cylinder 22 is actuated to increase the pressure of brake fluid within the brake lines 26 according to the force applied to the brake master cylinder 22. The braking torque applied to the wheels 12 by the brakes 24 varies according to the pressure of brake fluid within the system, e.g. within the brake lines 26.

The brake system 20 further comprises a brake booster 23 configured to amplify the force applied to the brake master cylinder 22 when the brake pedal 14b is depressed by the driver.

The brake booster 23 comprises a negatively pressurized brake booster chamber 23a and a diaphragm 23b. When the brake pedal 14b is depressed, the diaphragm is exposed to atmospheric air on one side, while the other side is exposed to the vacuum pressure within the brake booster chamber 23a. This pressure difference across the diaphragm 23b provides additional braking force to the brake master cylinder 22, amplifying the force being applied to the brake pedal 14b by the driver.

Using the brake booster 23 to amplify the braking force in this way has the effect of a lighter feeling brake pedal, as the driver need not push as hard to achieve the desired level of braking. Furthermore, amplifying the braking force allows a greater braking torque to be applied to the wheels by the brake system 20, reducing braking distances of the vehicle.

The motor vehicle 2 may comprise a vacuum pump 40 configured to provide vacuum pressure to the brake booster chamber 23a. The vacuum pump 40 may be connected to the brake booster 23 via an air line 42. In the arrangement shown, the vacuum pump 40 is a mechanical pump and is driven, e.g. directly driven, by the engine 4. Hence, the vacuum pump operates continuously while the engine is running. However, in other arrangements, the vacuum pump 40 may be selectively couplable to the engine 4, such that the vacuum pump 40 can be decoupled from the engine 4 when a suitable vacuum pressure is available within the brake booster chamber 23a. In other arrangements, vacuum pump 40 is a mechanical pump and is driven directly by an output shaft of transmission 10b.

Additionally or alternatively, the brake booster 23 may be connected via the air line 42 to an inlet manifold of the engine 4. The vehicle 2, e.g. the engine 4 and an intake system of the motor vehicle, may be configured such that a vacuum pressure is generated at the inlet manifold. The brake booster 23 may be charged with vacuum pressure from the inlet manifold via the air line 42.

In some arrangements, the vehicle 2 may be provided with a Venturi device, such as a super aspirator, configured to generate a vacuum pressure at a throat of the Venturi device by virtue of a pressure difference between an inlet and an outlet of the Venturi. For example, the inlet of the super aspirator may be coupled to an inlet of the intake system of the vehicle and the outlet may be coupled to the inlet manifold of the engine 4. The pressure difference between the inlet and outlet of the super aspirator may be generated by virtue of the operation of the engine 4. The brake booster 23 may be connected to the throat of the Venturi device via the air line 42.

The vehicle 2 may additionally or otherwise comprise any other desirable vacuum source configured to provide vacuum pressure to the brake booster 23 during operation of the engine 4.

The vehicle 2 further comprises a stop-start system 100. The stop-start system 100 is configured to perform a stop-start operation of the vehicle 2 by controlling the operation of the engine 4 to shut down the engine 4 automatically when a pre-determined engine shut down condition is achieved and restart the engine, e.g. by operating the BISG 6 to crank the engine, when a pre-determined engine restart condition is achieved.

The stop-start system 100 may comprise a controller 102 configured to determine when to shut down and restart the engine 4, and to control the operation of the engine 4 and the BISG 6 accordingly. The controller 102 may be a dedicated controller of the stop-start system 100. Alternatively, the controller 102 may be provided as part of one or more other systems of the vehicle, such as an engine assembly or powertrain of the vehicle. For example, the controller 102 may be an engine control unit or a powertrain control module. Alternatively, the controller 102 may be another controller of the vehicle, such as a body control module.

The vehicle 2 may comprise one or more sensors configured to monitor the operation of the vehicle. The sensors may be operatively coupled to the controller 102 and may provide sensor readings to the controller 102 for the stop-start system 100 to determine whether the engine 4 should be shut down or restarted automatically. For example, as depicted in FIG. 1, the vehicle 2 may comprise a brake sensor 16a, a brake booster sensor 16b, a clutch sensor 16c and a gear sensor 16d.

The brake sensor 16a may be configured to determine the level of braking torque being applied to the wheels 12 by the braking system 20. In the arrangement shown, the brake sensor 16a comprises a pressure sensor configured to determine the pressure of brake fluid within the brake lines 26. However, in other arrangements, the brake sensor 16a may be configured to determine a displacement of the brake pedal 14b to determine a braking torque being provided.

The brake booster sensor 16b may be provided in communication within the brake booster chamber 23a and may be configured to determine the vacuum pressure level within the brake booster chamber 23a.

The clutch sensor 16c may be configured to determine when the clutch pedal 14c is being depressed to decouple the drive system 10 from the engine 4. The gear sensor 16d may be configured to determine a gear setting of the drive system 10, e.g. whether the gear box 10*b* of the drive system 10 is in a neutral gear.

In the arrangement depicted in FIG. 1, the stop-start system 100 is configured to shut down the engine 4 automatically when the vehicle is travelling at or below a first threshold speed, for example, when the vehicle is substantially stationary, and a neutral gear of the transmission has been selected. This type of stop-start operation may be referred to as a Stop-In-Neutral (SIN) operation. The stop-start system may be configured to restart the engine following a SIN operation when the clutch pedal 14*c* is depressed by the driver, indicating that the driver is preparing to pull away.

When the motor vehicle 2 comprises an automatic transmission, the stop-start system 100 may be configured to shut down the engine 4 automatically when the vehicle is travelling at or below the first threshold speed and the braking torque being applied by the brake system 20 is above a threshold level. In this arrangement, the stop-start system may be configured to restart the engine 4 of the motor vehicle 2 automatically, when the braking torque provided by the brake system 20 drops below the threshold level or a further threshold level.

As the vehicle 2 comprises the BISG 6 capable of cranking and restarting the engine 4 while the vehicle is moving and is in gear, e.g. when the drive system 10 is operatively coupled to the engine 4 by the clutch 10*a*, the stop-start system 100 may additionally be configured to perform a Rolling Stop-Start (RSS) operation. The RSS operation may be performed when the vehicle is travelling above a lower threshold speed, e.g. when the vehicle is not stationary. The vehicle may therefore continue moving during the RSS operation after the engine 4 has been automatically shut down.

The RSS operation may be performed when it is determined that the driver is intending to bring the vehicle 2 to a stop. For example, the RSS operation may be performed when: the vehicle is travelling below an upper threshold speed; the clutch pedal is pressed; a neutral gear has been selected, and/or the brake pedal is depressed.

Performing the RSS operation enables a length of time that the engine 4 is shut down to be increased, further improving the reduction in fuel consumption provided by the stop-start system 100.

If the vehicle is brought to a stop, e.g. a speed below the lower threshold speed, and a neutral gear is selected during the RSS operation, the RSS operation may become a SIN operation, which may be performed in the manner described above. The lower threshold speed may be equal to the first threshold speed.

Providing the BISG 6 enables the engine 4 to be automatically restarted without the vehicle being brought to a stop and without the driver selecting a neutral gear. The driver may therefore be allowed to change their mind about stopping the vehicle 2 once the RSS operation has been initiated by the stop-start system 100.

As described above, the brake system 20 comprises the brake booster 23 that utilizes the brake booster chamber 23*a* charged with vacuum pressure to improve the braking performance of the vehicle 2. When the brake system is operated, the vacuum pressure may be reduced. In other words, the pressure within the brake booster chamber 23*a* may increase, e.g. approach atmospheric pressure. In some arrangements, the vacuum pressure within the brake booster chamber 23*a* may be depleted following two or three operations of the brakes.

As described above, the vacuum pressure may be provided to the brake booster 23 at least in part by a vacuum pump 40 driven by the engine 4. During a stop-start operation of the motor vehicle when the engine 4 is shut down, the vacuum pump 40 is not operating, and hence, vacuum pressure may not be replenished. It may be undesirable for the performance of the brake system 20 to be reduced at any point during operation of the motor vehicle 2. The controller 102 may therefore be configured to restart the engine 4 automatically if the vacuum pressure within the brake booster chamber 23*a* becomes depleted.

During a SIN operation of the stop-start system, or any other stop-start operation during which the vehicle is stationary, the driver may be unlikely to operate the brake system 20 such that the vacuum pressure becomes depleted. Hence, the controller 102 may be unlikely to restart the engine 4 due to a lack of brake booster vacuum.

In contrast, as the vehicle continues moving after the engine 4 has been shut down during the RSS operation, the driver is more likely to operate the brake system during the RSS operation, such as to control the vehicle 2 in response to other vehicles or hazards on the road, for example. It is therefore more likely that the vacuum pressure within the brake booster chamber 23*a* will become depleted during an RSS operation.

It may therefore become desirable to restart the engine 4 to replenish the vacuum pressure within the brake booster chamber 23*a* before the engine 4 is required to provide power to drive the vehicle 2. This limits the duration of the RSS operation and reduces the benefit of reduced fuel consumption provided by the RSS operation.

To increase the duration of the RSS operation, the vehicle 2 comprises an auxiliary vacuum pump 50 configured to provide vacuum pressure to the brake booster 23 during the RSS operation, in order to maintain the vacuum pressure within the brake booster chamber 23*a* and reduce the likelihood of the engine 2 being restarted.

The auxiliary vacuum pump 50 may be operated by the controller 102 when the RSS operation is being performed. In some arrangements, the auxiliary vacuum pump 50 may be operated continuously during the RSS operation. Alternatively, the controller 102 may be configured to operate the auxiliary vacuum pump 50 when the pressure within the brake booster chamber 23*a* increases to a first threshold pressure during the RSS operation.

In some arrangements, the controller 102 may be configured to operate the auxiliary vacuum pump 50 instead of restarting the engine 4 to provide vacuum pressure the brake booster 23. Alternatively, the controller 102 may be configured to operate the auxiliary vacuum pump 50 when the pressure within the brake booster chamber 23*a* increases to the first threshold pressure and restart the engine 4 if the pressure within the brake booster chamber 23*a* increases to a second threshold pressure, which may be greater than the first threshold pressure.

The auxiliary vacuum pump 50 may be electrically driven, e.g. by an electric motor. In the arrangement depicted in FIG. 1, the auxiliary vacuum pump 50 is driven by the starter motor of the vehicle, e.g. the BISG 6. The starter motor may be configured to selectively decouple from the engine 4, such that the auxiliary vacuum pump 50 can be driven without the engine 4 being cranked by the starter motor. The controller 102 may be configured to control the starter motor to decouple from the engine 4, e.g. from the crankshaft of the engine 4, when the starter motor is driving the auxiliary vacuum pump 50. In other arrangements, a separate electric motor (not shown) may be provided to drive the auxiliary vacuum pump 50.

Figure 2:
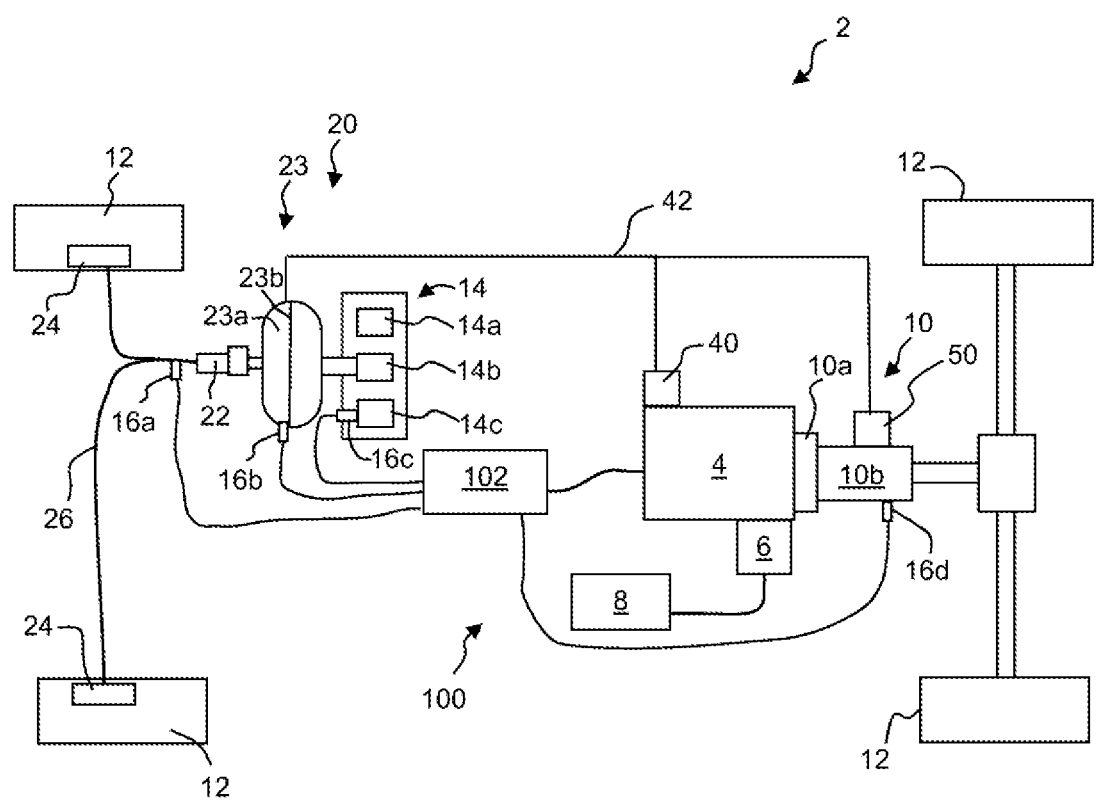
FIG. 2 is a schematic view of a vehicle assembly according to arrangements of the present disclosure.

With reference to FIG. 2, in other arrangements of the present disclosure, the auxiliary vacuum pump 50 may be a mechanically driven pump. In this arrangement, the auxiliary vacuum pump 50 is couplable to the gearbox 10b such that the auxiliary vacuum pump 50 can be driven by the drive system 10 when the clutch 10a is disengaged. For automatic transmission implementations auxiliary vacuum pump 50 may be coupled to the transmission output shaft with clutch 10a replaced by a torque converter.

The auxiliary vacuum pump 50 may be couplable, e.g. selectively couplable, to an output shaft of the gear box 10b, e.g. via a clutch. Alternatively, the auxiliary vacuum pump 50 may be permanently coupled to a gear of the gear box, e.g. a low gear, such as a first or second gear, a neutral gear or a dedicated gear for the auxiliary vacuum pump. In this way, the auxiliary vacuum pump 50 may be driven when the neutral gear, the low gear or the dedicated gear is selected.

The controller 102 may be configured to control the operation of the gear box 10b to select the neutral, low or dedicated gear of the gear box 10b when the RSS operation is being performed, e.g. regardless of the pressure within the brake booster chamber 23a. Alternatively, the controller 102 may control the operation of the gear box 10b to select the neutral or low gear of the gear box 10b when it is desirable to operate the auxiliary vacuum pump 50, e.g. when the pressure within the brake booster chamber 23a increases to the first threshold pressure.

If the auxiliary vacuum pump 50 is not permanently coupled to a gear of the gear box 102, the controller 102 may control the auxiliary vacuum pump 50 to couple to the shaft of the gear box 10b when desirable. For example, the controller 102 may couple the auxiliary vacuum pump 50 to the shaft of the gear box 10b when a predetermined gear of the gearbox 10b, e.g. a low gear such as the first or second gear or a neutral gear, is selected, e.g. by the driver, the controller 102 or another controller of the vehicle.

Additionally or alternatively, the controller 102 may be configured to couple the auxiliary vacuum pump 50 to the shaft of the gear box 10b when the vehicle is travelling at less than a further threshold speed. The further threshold speed may be greater than the upper threshold speed. Alternatively, the further threshold speed may be less than or may be equal to the upper threshold speed.

For some configurations of auxiliary vacuum pump 50, it may be desirable for the auxiliary vacuum pump 50 to begin operating to provide vacuum pressure to the brake booster 23 before the driver applies the brakes and/or before the level of vacuum pressure within the brake booster chamber 23a is reduced. The controller 102, or another controller of the vehicle 2, may be configured to predict whether the driver is expected to apply the brakes. For example, the controller 102, or other controller of the vehicle, may refer to object sensors provided on the vehicle and the prediction of whether the driver is expected to apply the brakes may be made based on the positions and/or changes in position of objects located around the vehicle. If the driver is predicted to apply the brakes, the auxiliary vacuum pump 50 may be operated.

In some arrangements, the vehicle 2 may comprise an automatic braking system configured to apply the brakes of the vehicle automatically, for example, according to the relative positions of objects, such as other vehicles, around the vehicle 2, and/or traffic signals ahead of the vehicle. In such arrangements, the controller 102, and/or another controller, e.g. a controller of the automatic braking system, may be configured to operate the auxiliary vacuum pump 50 when the brakes are applied by the automatic braking system and/or if it is determined that the automatic braking system is likely to apply the brakes during a current RSS operation.

As mentioned above, in some arrangements, the BISG 6 may be configured to provide power to the drive system 10 when the engine 4 is shut down to enable to vehicle 2 to perform maneuvers. In some arrangements, such maneuvers may be performed during the RSS operation of the vehicle 2, and the controller 102, or another controller, may be configured to operate the BISG 6 as appropriate.

Figure 3:
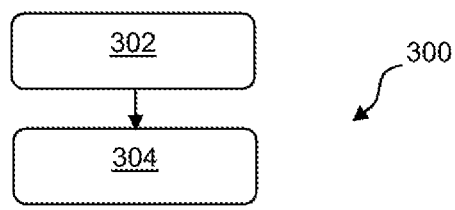
FIG. 3 is a block diagram showing a method of operating a motor vehicle according to arrangements of the present disclosure.

With reference to FIG. 3, a method 300 of operating a stop-start system 100 according to arrangements of the present disclosure, will now be described.

The method 300 comprises a first step 302, in which the engine 4 is automatically shut down. The engine 4 may be shut down when a predetermined engine shut down condition is achieved, e.g. when the vehicle is travelling at a speed below the upper threshold speed, the clutch pedal 14c is depressed and/or the brake system 20 is operated, and/or when it is otherwise determined or predicted that the driver is intending to bring the vehicle 2 to a stop. Furthermore, the engine 4 may be shut down when the vehicle is travelling at a speed greater than a predetermined threshold speed, e.g. while the vehicle is moving. In other words, the engine 4 may be shut down during the first step 302 to perform a rolling stop-start operation of the motor vehicle 2.

The method 300 further comprises a second step 304, in which the auxiliary vacuum pump 50 is operated during the RSS operation, to provide vacuum pressure to the brake booster 23.

As described above, the auxiliary vacuum pump 50 may be operated when the vacuum pressure within the brake booster chamber 23a has been reduced. The method may comprise a pressure determination step, in which a pressure of the brake booster chamber 23a is determined, e.g. using the brake booster sensor 16b. The auxiliary vacuum pump 50 may be operated when the pressure rises above the first threshold pressure.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

What is claimed is:

1. A vehicle stop-start system, comprising:
   a controller configured to automatically shut down a vehicle engine when the vehicle is moving and a predetermined engine shut down condition is achieved to provide a rolling stop-start operation; and
   a mechanically-driven auxiliary vacuum pump driving by a rotating vehicle component and configured to provide vacuum pressure to a vehicle brake booster, wherein the controller is configured to operate the mechanically-driven auxiliary vacuum pump during the rolling stop-start operation, and wherein the mechanically-driven auxiliary vacuum pump is driven by a transmission output shaft.

2. The vehicle stop-start system of claim 1, wherein the controller is configured to operate the mechanically-driven auxiliary vacuum pump in response to the vacuum pressure being below an associated threshold.

3. The vehicle stop-start system of claim 1, further comprising an automatic transmission.

4. The vehicle stop-start system of claim 1, wherein the mechanically-driven auxiliary vacuum pump is coupled to a transmission gear.

5. The vehicle stop-start system of claim 1, wherein the controller is configured to selectively couple the mechanically-driven auxiliary vacuum pump to the transmission output shaft.

6. The vehicle stop-start system of claim 1, wherein the controller is configured to operate the mechanically-driven auxiliary vacuum pump when vehicle speed is below a second threshold speed.

7. The vehicle stop-start system of claim 1, wherein the mechanically-driven auxiliary vacuum pump is operatively coupled to the transmission output shaft such that the mechanically-driven auxiliary vacuum pump is driven by the transmission when the transmission is configured to provide a low gear ratio or is in a neutral gear.

8. A vehicle comprising:
an engine;
a vacuum pump driven by the engine and coupled to a brake system;
a transmission;
an auxiliary vacuum pump coupled to the brake system, the auxiliary vacuum pump coupled to and driven by an output shaft of the transmission; and
a controller configured to automatically shut down the engine while the vehicle is moving and vehicle speed is below a threshold and to control the auxiliary vacuum pump to increase vacuum of the brake system.

9. The vehicle of claim 8 wherein the auxiliary vacuum pump is coupled to an output shaft of the transmission.

10. The vehicle of claim 8 wherein the transmission comprises an automatic transmission.

11. The vehicle of claim 8 wherein the controller is configured to automatically restart the engine responsive to vacuum pressure within the brake system becoming depleted.

12. The vehicle of claim 8 further comprising a clutch disposed between the engine and the transmission, wherein the controller is further configured to control the clutch.

13. The vehicle of claim 8 wherein the controller is further configured to control the auxiliary vacuum pump in response to braking pressure within the brake system.

14. A vehicle comprising:
an engine;
a vacuum pump driven by the engine and coupled to a brake system;
a transmission;
an auxiliary vacuum pump coupled to the brake system and driven by the transmission;
a Belt Integrated Starter-Generator (BISG); and
a controller configured to automatically shut down the engine while the vehicle is moving and vehicle speed is below a threshold and to control the auxiliary vacuum pump to increase vacuum of the brake system, wherein the controller is configured to operate the BISG to provide power to drive wheels of the vehicle during a rolling stop-start operation of the vehicle.

* * * * *